May 28, 1963   J. TAINI ETAL   3,091,169
AUTOMATIC PHOTOPRINTING MACHINE
Filed June 29, 1960   8 Sheets-Sheet 1

Inventors
John Taini and
Edwin S. Johnson
By Mann, Brown & McWilliams
Attys.

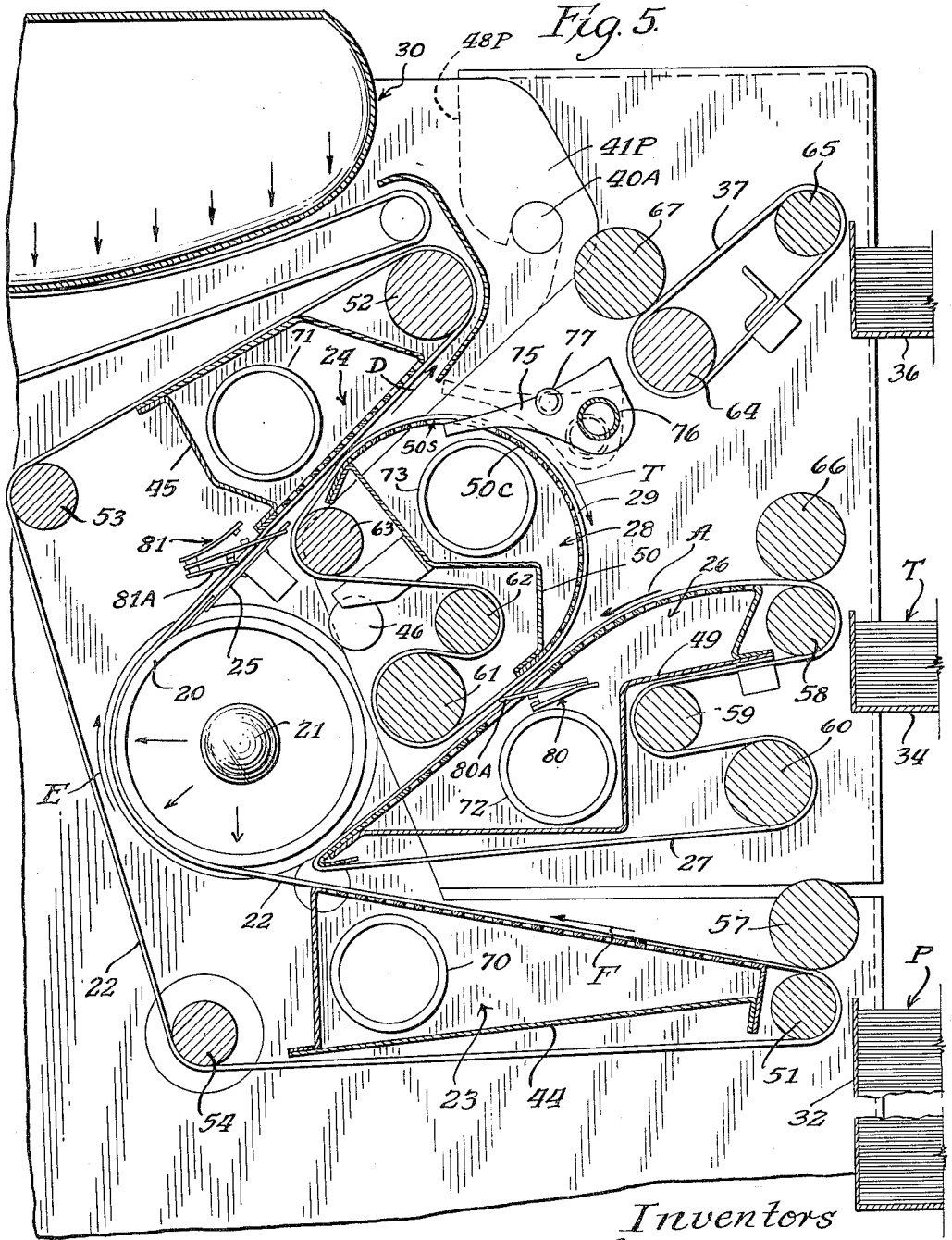

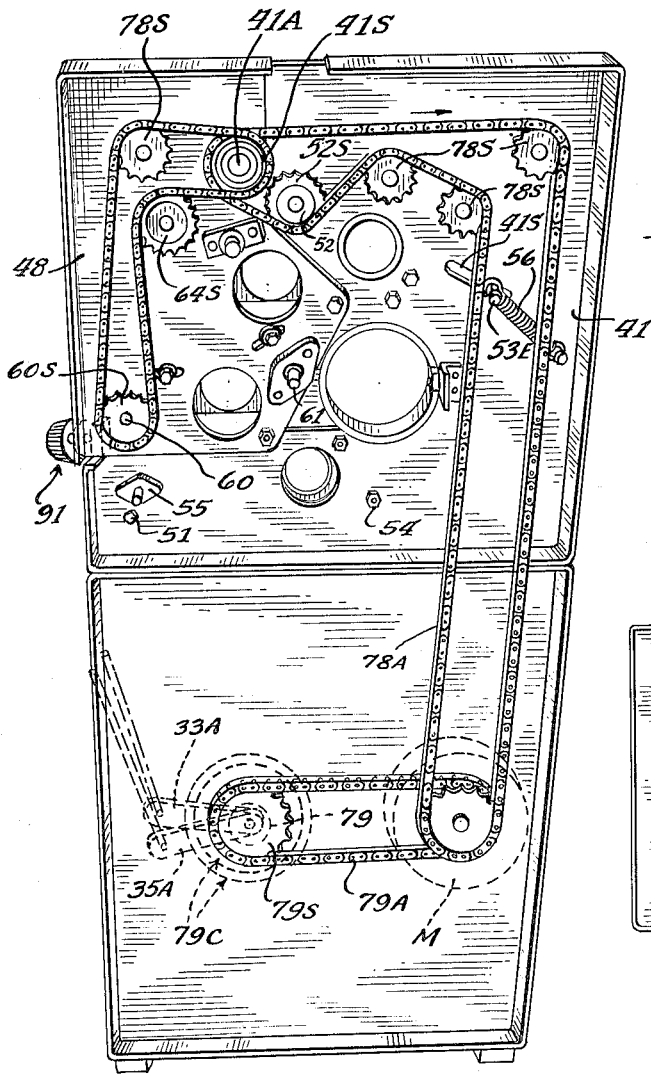
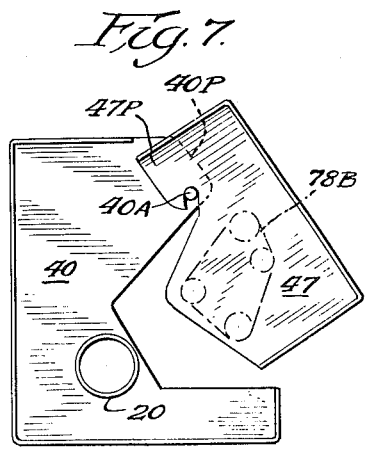

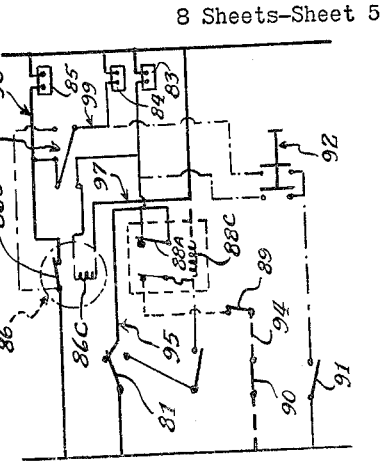
Fig. 9-C.
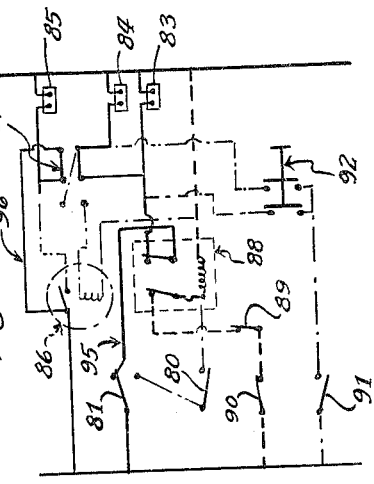
Fig. 8B.
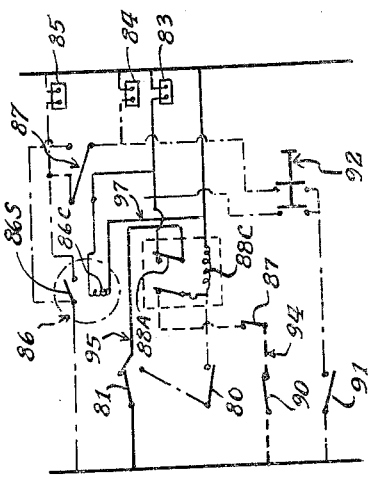
Fig. 9B.
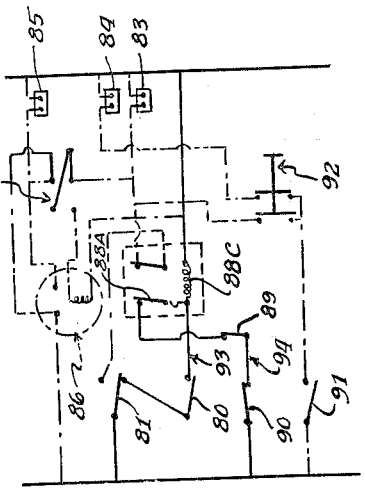
Fig. 8A.
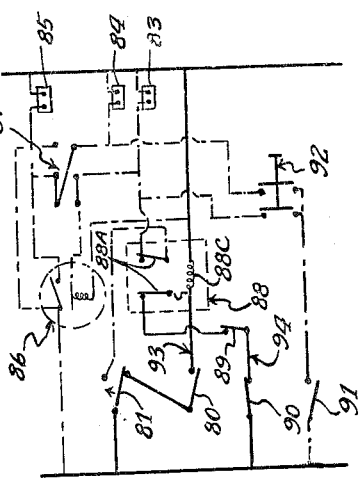
Fig. 9A.

Inventors:
John Taini and
Edwin S. Johnson
By Mann, Brown & McWilliams, Attys.

May 28, 1963  J. TAINI ETAL  3,091,169
AUTOMATIC PHOTOPRINTING MACHINE
Filed June 29, 1960  8 Sheets-Sheet 7
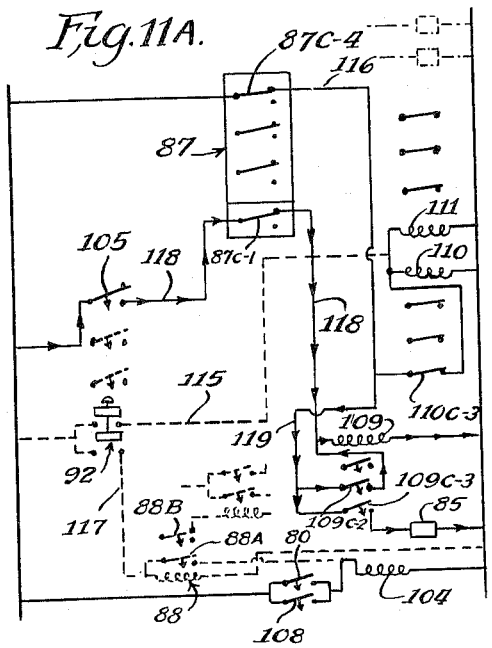
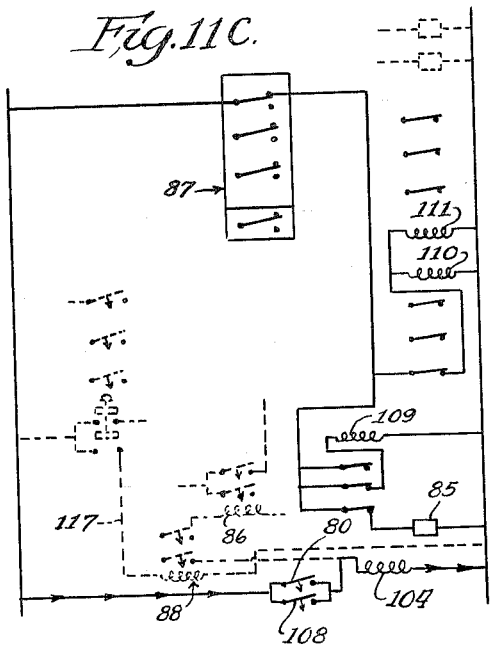
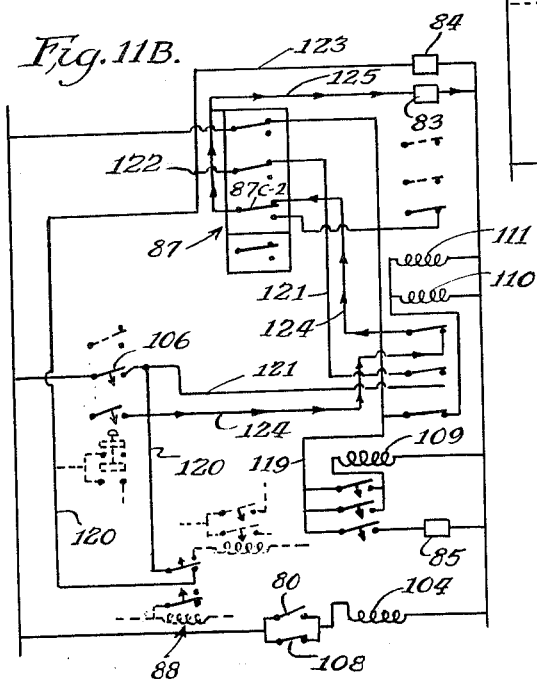
Inventors
John Taini and
Edwin S. Johnson
By Mann, Brown & McWilliams
Attys.

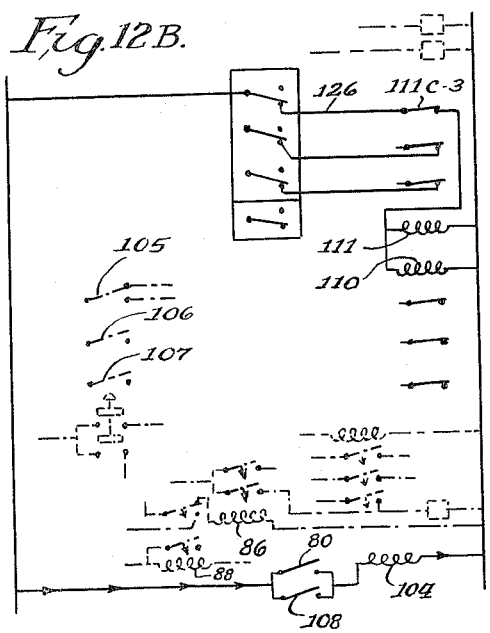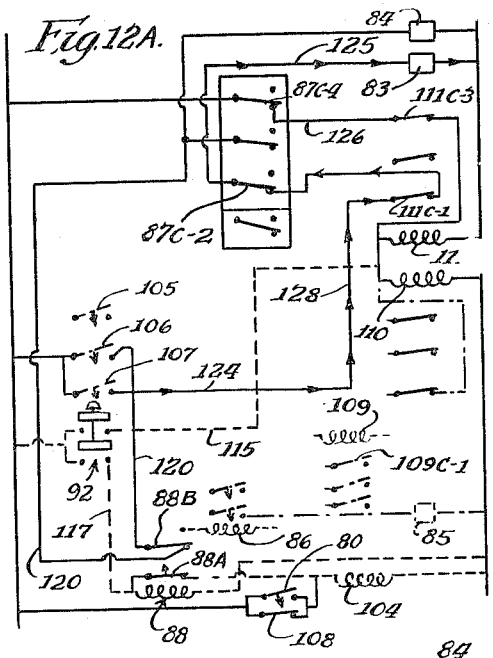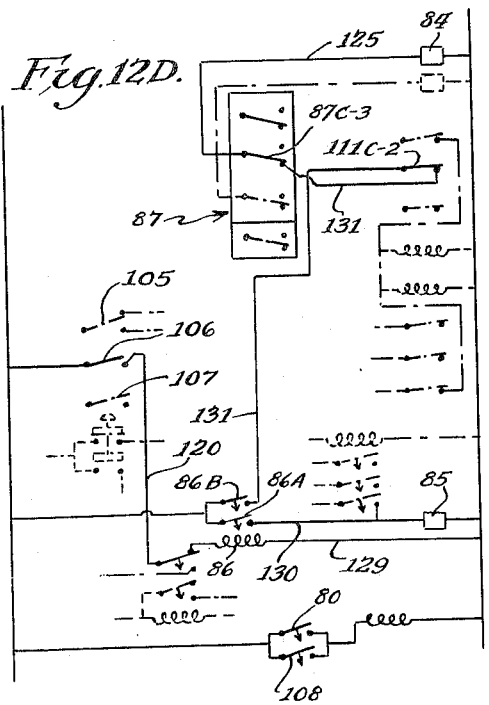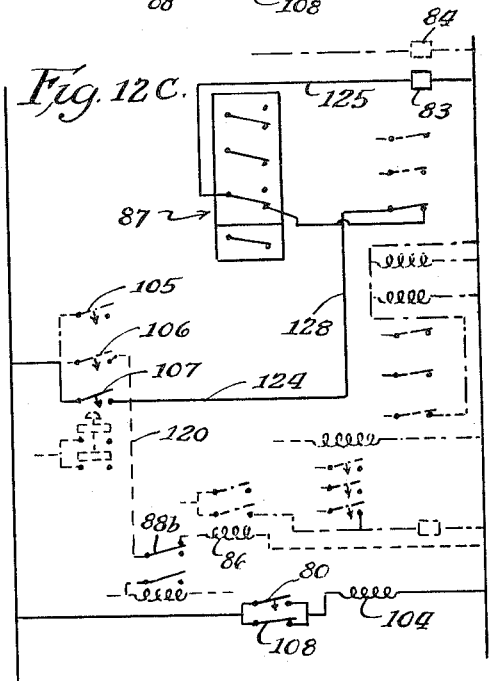

United States Patent Office 3,091,169
Patented May 28, 1963

3,091,169
AUTOMATIC PHOTOPRINTING MACHINE
John Taini, Chicago, and Edwin S. Johnson, Glenview, Ill., assignors, by mesne assignments, to Ditto, Incorporated, Chicago, Ill., a corporation of Illinois
Filed June 29, 1960, Ser. No. 39,578
23 Claims. (Cl. 95—77.5)

This invention relates to photoprinting machines and is concerned with providing facilities for automatically controlling feeding of original tracings and of sensitized print paper in accordance with a predetermined program. More particularly, the invention relates to a machine for handling cut sheets of sensitized print paper, with the machine being selectively settable for automatically making multiple copies of a single tracing or single copies of a series of tracings or various numbers of copies from a series of tracings.

The term "photoprinting machines" is intended to identify machines for making blueprints or ammonia prints from tracings and is also applicable to and includes any type of contact photoprinting apparatus.

Prior art photoprinting machines for mechanizing the feeding of tracings and sensitized print paper are available, but they do not provide the necessary versatility, ease of handling, and low cost, and thus have failed to satisfy the genuine need which exists in this art for a photoprinting machine that can handle fully automatically the making of multiple copies from a single tracing or single copies from each of a series of tracings. Some known photoprinting machines require that the tracings be manually clamped in place on an exposure cylinder for continuous rotation with the cylinder, while others provide automatic mechanism for maintaining the tracing in fixed position on the rotating cylinder. Other known photoprinting machines utilize a stationary exposure cylinder in order to accommodate desired sensing and control mechanism, but this leads to a generally unsatisfactory paper-feeding action. There are other photoprinting machines which depend for their operation upon the use of a continuous sheet of print paper, but this arrangement involves a wastage of the print paper, there being an irreducible minimum section of print paper between adjacent exposed sections, and the arrangement also limits each machine from a practical standpoint to the handling of but one size of tracing.

Most of the photoprinting machines that incorporate automatic control appear to require specialized techniques for controlling the routing, separation, and removal of the original tracings and of the print paper. These machine arrangements are not compatible with the provision of conventional suction controls which have proven their utility and reliability.

Accordingly, the principal object of the invention is to provide a fully automatic photoprinting machine versatile in its functioning and use and capable of automatically making variable numbers of copies from a series of tracings.

Another object of the invention is to provide a fully automatic photoprinting machine for handling sheets of various lengths without waste.

Still another object of the invention is to provide a fully automatic photoprinting machine for handling cut sheets of sensitized printing paper.

A further object of the invention is to provide a fully automatic photoprinting machine for making multiple copies from a single original tracing wherein the tracing is fed partially around the periphery of an exposure cylinder and is then fed through a transfer path separated from the cylinder to return to the cylinder in predetermined, registered relation with the next sheet of print paper.

Still a further object of the invention is to provide an automatic photoprinting machine utilizing conventional suction and webbing arrangements for controlling routing, separation, and removal of the sheet material.

Another object of the invention is to provide a photoprinting machine construction having major sections thereof pivotally mounted for swinging movement to provide convenient access to the interior of the machine for cleaning the surface of the exposure cylinder.

Briefly, in a preferred constructional embodiment, the machine employs a revolving translucent exposure cylinder that contains a suitable light source for illuminating sheet material moving on the periphery of the cylinder. An original tracing and sensitized print paper are fed along separate paths to arrive in superposed relation at a point on the periphery of the cylinder, and they are maintained in contact with the cylinder for movement therewith through an exposure path that extends partially about the light source. A delivery path for this sheet material leads away from the periphery of the cylinder and the exposed print material is maintained along this path for ultimate delivery to a developing unit while the tracing is separated either for ejection from the machine if but a single copy is to be made, or for refeeding for repeated exposure to the cylinder if multiple copies are to be made.

Two different forms of control mechanism are disclosed, and each is arranged to operate when the original tracing and the print paper are moving along the delivery path at a point in advance of the transfer path for refeeding the tracing to synchronize the arrival of the tracing at the cylinder with the arrival of the next sheet of print paper. A sensing switch on the approach path of the tracing to the cylinder initially prepares the control circuit for subsequent actuation by the first sensing switch. The provision of the transfer path separate from the cylinder facilitates the sheet-feeding and control mechanisms and the timing control is recycled after each print to insure proper registry of the refed tracing with the next sheet of print paper as they enter upon the exposure cylinder. It will become apparent that the timing control is equally applicable to sheet material of various lengths.

Other objects and advantages will become apparent during the course of the following description.

In the accompanying drawings forming a part of this specification and in which like numerals are employed to designate like parts throughout the same:

FIG. 5 is an enlarged vertical cross-sectional view corresponding generally to the diagrammatic illustration of FIG. 1 and better illustrating the mechanical construction;

FIG. 6 is a face view of one of the end panels of the machine frame illustrating the mechanical drive;

FIG. 7 is a face view of the other end panel of the machine frame, further illustrating the mechanical drive arrangement;

FIGS. 8A and 8B are corresponding diagrams illustrating the functioning of the control circuit of FIG. 2 when the machine is set for single-copy production;

FIGS. 9A, 9B and 9C are related diagrams illustrating the functioning of the control circuit of FIG. 2 when the machine is set for multiple-copy production;

FIGS. 11A, 11B and 11C are diagrams illustrating the function of the control circuit of FIG. 10 when the machine is set for single-copy production; and FIGS. 12A, 12B, 12C and 12D are related diagrams illustrating the function of the control circuit of FIG. 10 when the machine is set for multiple-copy production.

General Arrangement and Operation

Figure 1:
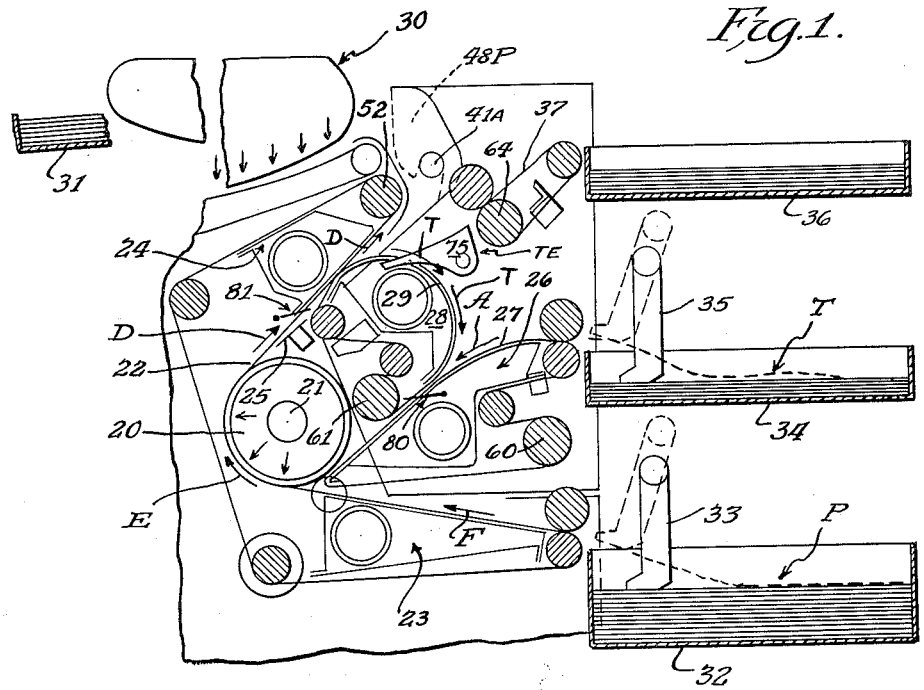
FIG. 1 is a diagrammatic side-elevational view illustrating the general arrangement and operation of a preferred form of automatic photoprinting machine.

A preferred photoprinting machine arrangement is illustrated diagrammatically in FIG. 1 as employing a rotatably mounted translucent cylinder 20 containing a suitable light source 21 for illuminating sheet material as it is moved around the cylinder under the control of a main conveying belt 22 which is engaged over a series of rollers to train the belt around a portion of the periphery of the cylinder. The belt 22 may comprise a series of closely spaced webs perforated to provide openings for developing suction at numerous points along the travel path of the belt for holding sheet material to the moving belt to thereby control the feeding of the sheet material through the machine. The arcuate run of the belt that is trained about the cylinder 20 defines an exposure path indicated by the arrow E and the moving belt cooperates with the cylinder to hold sensitized print paper and an original tracing in contact with the cylinder as the sheet material is moved through its exposure path by the action of the moving belt on the rotatable cylinder.

A horizontally arranged suction chamber 23 is located beneath a horizontal run of the belt to define a feed path indicated by the arrow F for advancing sensitized print paper up to the cylinder. An inclined suction chamber 24 is located along an inclined run of the belt to define a delivery path indicated by the arrow D, through which both sensitized print paper and the original tracing advance. A guide plate 25 is shown in adjacent parallel relation to the exposed face of the lower end of the inclined section of the belt to guide sheet material from the cylinder to the delivery path.

An inclined suction chamber 26 is located within a separate conveying belt 27 and is inclined to define an approach path A for feeding original tracings up to the exposure path at the periphery of the cylinder.

Finally, a suction chamber 28 generally of semi-circular configuration is disposed intermediately of the suction chambers 24 and 26 to cooperate with another conveying belt 29 in providing a transfer path indicated by the arrow T that extends about the suction chamber 28 and moves in a direction to convey the original tracings from the delivery path D to the approach path A.

A developing unit designated generally as 30 is located at the upper end of the delivery path D and is provided with a storage tray 31 for receiving developed copies of print paper as they emerge from the developing unit. The developing unit may be of any suitable form known to those familiar with this art.

Cut sheets of print paper designated generally as "P" are shown stacked in a print paper feed tray 32 for delivery individually to the machine under the control of a print paper feed mechanism 33. Original tracings designated generally as "T" are shown stacked in a tracing storage tray 34 for delivery individually to the machine under the control of a tracing feed mechanism 35, while a storage tray for ejected tracings is shown at 36. A conveying belt 37 is operable to feed tracings from the delivery path D to the storage tray 36.

As will become apparent, this machine arrangement is capable of automatically handling the production of single copies from a series of originals or it may be set to produce multiple copies from a series of originals. Various programming control arrangements may be used to control the setting of the machine, and these ancillary control arrangements may be of any suitable form such as punched tape, magnetic tape, or various types of electrical storage and memory circuits.

When the machine is set for single-copy production, the print paper feed mechanism 33 and the tracing feed mechanism 35 may be actuated jointly or, depending upon the path lengths, these mechanisms may be actuated in a corresponding preselected time sequence. The print paper feed mechanism 33 automatically supplies a sheet of print paper to the feed path F, which advances the print paper up to the exposure path E extending around the cylinder. Correspondingly, the tracing feed mechanism 35 automatically supplies a tracing to the approach path A to arrive at the exposure path E conjointly and in superposed relation to the sheet of print paper. The sheet material moves through the exposure path E and the delivery path D until the tracing falls free of the delivery path and enters the storage tray 36. In the meantime, the exposed print paper is advanced through the developer unit 30 and deposited in the storage tray 31.

When the machine is set for multiple-copy production, the tracing and print paper for the first copy are introduced in the same manner set forth above; and after exposure, the copy is again advanced along the delivery path D and through the developer unit 30 and deposited in the storage tray 31. In the meantime, the print paper feed mechanism 33 is again actuated to supply another sheet of print paper to the feed path F, while the tracing is stripped from the exposed print and fed along the transfer path T and into the approach path to arrive at the exposure path conjointly with the second sheet of print paper. This cycle repeats until the desired number of copies has been made, and the tracing is then ejected to the storage tray 36.

The controls are arranged so that a second tracing is introduced into the machine during the ejection of the original tracing, and additional print paper is fed into the machine in appropriately timed relation to permit the machine operation to continue uninterrupted.

Mechanical Construction

Figure 3:
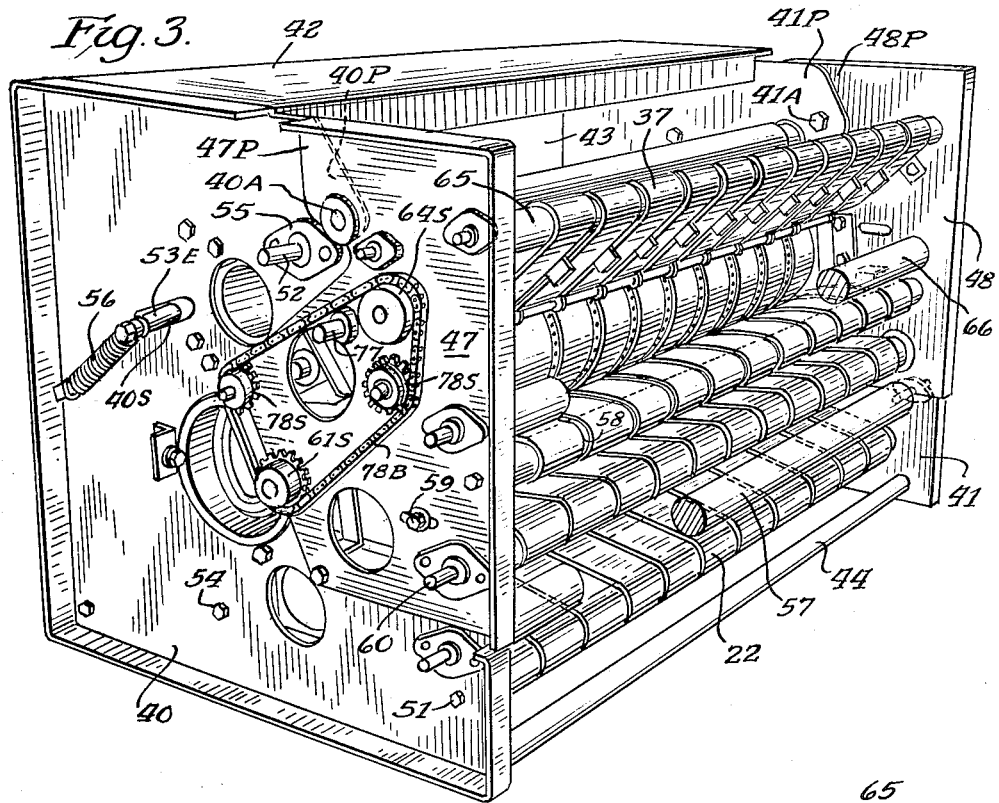
FIG. 3 is a perspective view looking into the front of the photoprinting machine, with the paper storage and feed mechanism removed to facilitate the illustration.
Figure 4:
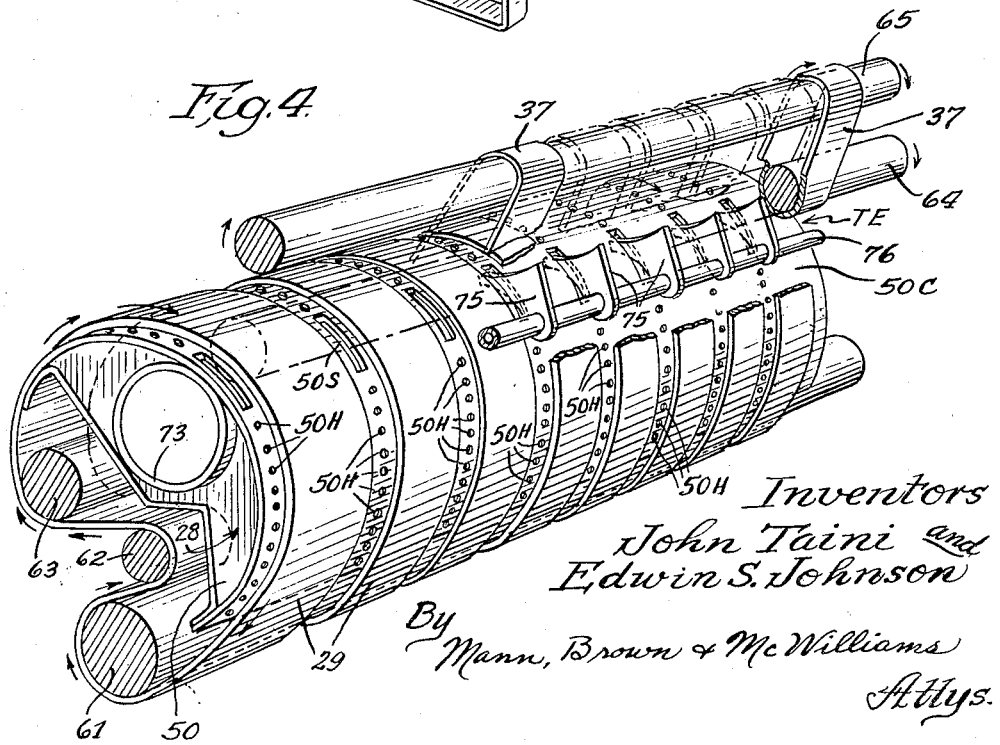
FIG. 4 is an enlarged perspective view illustrating the construction of the transfer mechanism for controlling the refeed of originals.

The mechanical details of construction are best shown in FIGS. 3, 4 and 5. The machine has a stationary main frame having end plates 40 and 41 interconnected by a top wall 42, a rear wall 43, hollow framing structure 44 that also defines the suction chamber 23, hollow framing structure 45 that also defines the suction chamber 24, and a number of reinforcement rods 46. The end plates are provided with outwardly projecting axles 40A and 41A which serve as mounting pivots for a movable frame section that comprises end plates 47 and 48 held in rigid spaced relation by hollow framing structure 49 that also defines the suction chamber 26 and hollow framing structure 50 that also defines the suction chamber 28.

In the stationary main frame, the main conveying belt 22 is trained over a series of rollers 51, 52, 53 and 54 and around a portion of the periphery of the cylinder 20. The rollers 51, 53 and 54 are idlers, and each may be of the type that comprises a central spindle nonrotatably mounted in the end plates 40 and 41 and a roller sleeve journalled on the spindle. The roller 52 is a drive roller and suitable bearing plates 55 are provided for rotatably mounting it to the end plates 40 and 41. The spindle of idler roller 53 has axial end extensions 53E connected to bias springs 56 and mounted for sliding movement in end plate slots 40S and 41S to establish the desired tensioning of the belt 22. In addition, a feed roller 57 is positioned above the belt roller 51 to assist in feeding print paper P onto the horizontal feed path F.

In the movable main frame, the approach path belt 27 is trained over idler rollers 58 and 59 and drive roller 60 and around the framing structure 49; the transfer path belt 29 is trained over a drive roller 61 and idler rollers 62 and 63 and around the framing structure 50; and the belt 37 is trained over a drive roller 64 and an idler roller 65, all of these elements being connected between and jointly movable with the movable end plates 47 and 48. In addition, a feed roller 66 is positioned above the belt roller 58 to assist in feeding tracing paper T up to the approach path and a feed roller 67 is positioned above the belt roller 64 to assist in feeding the ejected tracings T to the storage tray 36.

The hollow framing structures 44, 45, 49, and 50 that define suction chambers 23, 24, 26 and 28, respectively, include end closure walls that are provided with connection stubs 70, 71, 72 and 73, at each end. The connection stubs are brought through the end plates of the machine to facilitate their connection to suitable suction-producing blower apparatus (not shown).

Each of the movable end plates 47 and 48 is provided adjacent its upper end with an inwardly extending portion 47P and 48P, respectively, that overlaps forwardly extending upper portions 40P and 41P of the stationary end plates. Each of the portions 47P and 48P is formed with a downwardly opening pivot slot for engagement over the pivot axles 40A and 41A to provide a swingable mounting arrangement for the movable frame. As shown in FIG. 7, the movable frame may readily be swung out sufficiently to afford access from the opposite ends of the machine for cleaning the rotatable exposure cylinder 20.

The drive mechanism for powering the apparatus, as best illustrated in FIG. 6, includes a drive motor M mounted in the base of the machine and connected to a main drive chain 78A which is trained over a number of idler sprockets 78S that are rotatably mounted on the end panels 41 and 48 located at the left-hand end of the machine. The chain 78A is also trained over sprockets 52S, 60S and 64S which are keyed to the corresponding drive rollers 52, 60 and 64. A double sprocket idler 41S is provided on the pivot axle 41A to accommodate pivoting of the movable frame without requiring disengagement of the drive chain 78.

The right-hand end of the drive roller 64 is also fitted with a sprocket 64S (see FIGS. 5 and 7) for transmitting power to a sprocket 61S provided on the right-hand end of drive roller 61. A link chain 78B engages the sprockets 61S and 64S and is also engaged over idler sprockets 78S rotatably mounted on the movable end panel 47.

The paper-feeding mechanisms 33 and 35 (FIG. 1) are actuated by operating arms 33A and 35A, respectively, (FIG. 6) which are connected through suitable clutches 79C to a shaft 79 journalled in the base of the machine. A chain 79A engages a sprocket 79S to drive the shaft 79. Actuating mechanisms 83 and 84 (FIGS. 2 and 10) control engagement of the clutches for connecting the operating arms 33A and 35A of the paper-feeding mechanisms 33 and 35 to the shaft 79.

An ejector mechanism TE for controlling the routing of tracings from the delivery path D either to the storage tray 36 via belt 37 (during single-copy production) or to the approach path A via transfer belt 29 (during multiple-copy production) is shown in FIGS. 4 and 5. The ejector mechanism includes a series of guide plates or fingers 75 mounted to a common rod 76 and disposed in parallel, laterally spaced relation across the upper run of the transfer path T. Pivot axles 77 are provided on the outermost guide plates 75 and are journalled in the movable end frames 47 and 48 to mount the ejector fingers for unitary swinging movement, as indicated in FIG. 5.

The framing structure 50 that defines the suction chamber 28 includes a semicircular wall portion 50C that is provided with a number of sets of holes or air openings 50H spaced apart laterally along the suction chamber 28, while the conveying belt 29 is composed of a series of belt strips located between adjacent sets of holes 50H.

Suction is applied through the space between the belt strips to hold the tracing sheets to the movable belts 29. Intermediately along each set of holes 50H, the wall 50C is provided with a peripheral slot 50S which is located to accommodate sufficient swinging movement of the ejector TE to allow its guide plates 75 to move inwardly of the periphery of the transfer path T. When the ejector guide plates 75 are in their full-line position of FIG. 5 wherein their ends project into the suction chamber 28, they act to strip an original tracing sheet from the transfer path and to direct it up to the belt 37 and cooperating roller 67 for delivery into the tray 36. When the ejector guide plates are swung to their dotted-line position of FIG. 5, tracings moving along the transfer path T pass beneath the guide plates 75 and continue around the suction chamber 28 and into the approach path A.

A sensing switch 80 is mounted within the suction chamber 26 and has its operating arm 80A biased to project outwardly across the approach path A so that sheet material which will either be a tracing introduced into the machine directly from storage tray 34 or a tracing being refed around the transfer path T may deflect the switch arm 80A to cause the switch to close and to remain closed until the sheet material clears the switch arm 80A.

Figure 2:
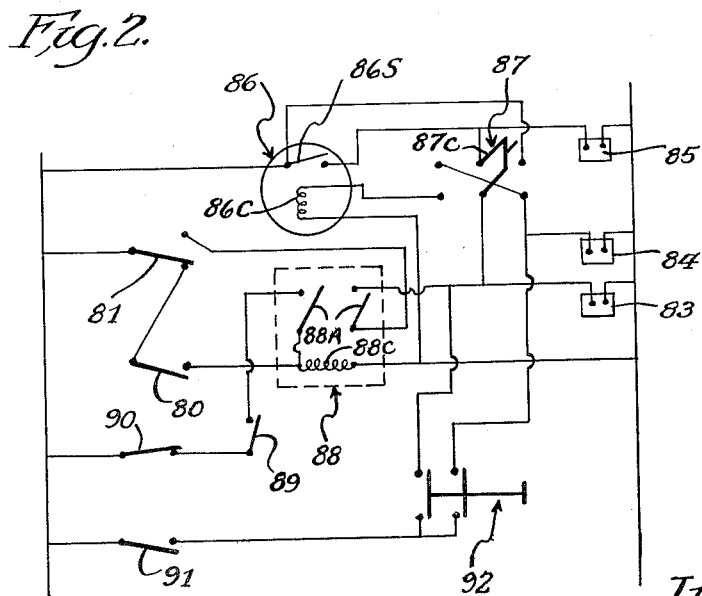
FIG. 2 is a diagram of one form of control circuit for the machine arrangement of FIG. 1.

Two alternative control circuit arrangements are shown. In the circuit of FIG. 2, a control switch 81 governs the timing of the feeding of the sheet material while, in the circuit of FIG. 10, cam-controlled switches 105, 106 and 107 regulate the timing.

Structurally, the switch 81 is mounted at a point along the delivery path D that is in advance of the transfer path T and preferably immediately forwardly of the suction chamber 24, and it is provided with a switch arm 81A biased to extend outwardly and intercept the delivery path D so that sheet material, which at this point will comprise both the print paper and tracing, will deflect the switch arm 81A to cause the switch contacts to close and remain closed until the sheet material clears this point.

Figure 10:
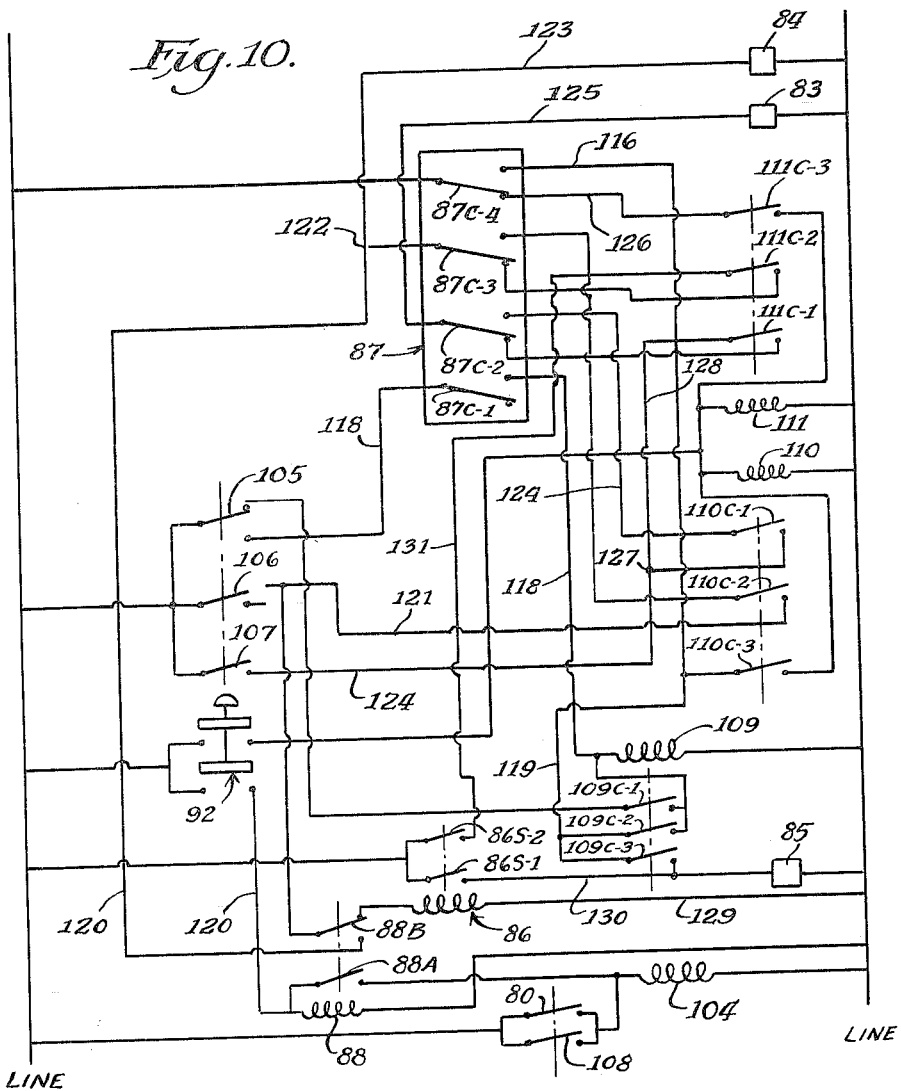
FIG. 10 is a diagram of another control circuit for the machine arrangement of FIG. 1.

Correspondingly, the cam-controlled switches of FIG. 10 are operated at a selected time when the print paper and tracing are on the delivery path D in advance of the transfer path T.

In one constructional embodiment of this machine, the travel distance along the travel path for sheet material moving from switch 80 to switch 81 is about 13¼" and the distance along the travel path for sheet material moving from switch 81 to switch 80 is about 10⅛". With this arrangement, the machine is able to handle fully automatically and without adjustment, various sizes of sheet material ranging between 5½" x 3½" and 18" x 24".

*FIG. 2 Control Circuit and Operation*

In the general arrangement of the control circuit of FIG. 2, the circuit is shown as including actuators 83, 84 and 85, respectively, for triggering the operation of the print paper feed mechanism 33, the tracing feed mechanism 35, and the ejector mechanism TE. A copy counter and control switch mechanism 86 having an operating coil 86C and a self-contained normally open switch 86S is interconnected with a selectively positionable double-pole double-throw switch 87 for controlling the ejector actuator 85 and the tracing feed actuator 84. The contact arms 87C of the selection switch 87 are thrown to the right for single-copy production and to the left for multiple-copy production.

The paper-sensing switches 80 and 81 are interconnected with a normally open double-pole single-throw relay-operated switch 88 having an operating coil 88C and contact arms 88A. A "hold" circuit for cooperation with the switches 80 and 81 in maintaining the continuity of operation of relay 88 is provided and comprises a normally open toggle switch 89 which is manually set in closed position at the beginning of machine operation and a normally closed microswitch 90 operatively connected to the print paper feed mechanism 33 to open momentarily once during each feed cycle for releasing relay 88. In order to change from single-copy to multiple-copy production, the double-throw switch 87 is employed, but it is necessary to first open the toggle switch 89 to allow the machine to clear before throwing the selection switch 87 from one position to another.

A starting circuit for initiating the automatic print feeding operation includes a microswitch 91, which is operatively attached to a speed control adjustment of the machine such as is shown at 91A in FIG. 6 so as to close only when the machine is running at low speed, and a double-pole, single-throw, normally open push-button type switch 92 which is connected in series with the low-speed switch 91 and is connected to momentarily energize the actuators 83 and 84 for initiating a feed cycle.

The counter mechanism 86 is settable to select the number of copies to be made from a given tracing, and following the completion of this number as determined by the operation of sensing switch 81, the counter mechanism operates to close its switch 86S for triggering the ejector actuator 85. A suitable counter switch of this type is shown in Bulletin No. 701A, put out by the Counter and Control Corporation of Milwaukee, Wisconsin.

*Single-Copy Production*

The operation of the machine for single-copy production may best be understood by reference to FIGS. 1, 5, 8A and 8B. It will be assumed that the machine is running at low speed so that the switch 91 is closed and it will be assumed that the selection switch 87 has been set for single-copy production and has its contact arms 87C in the right-hand position, as illustrated in FIGS. 8A and 8B. Push-button switch 92 is then closed momentarily to energize actuators 83 and 84 over obvious circuits. Thus print paper feed mechanism 33 and tracing paper feed mechanism 35 are operated to supply a sheet of print paper along feed path F and a sheet of tracing piper along approach path A for arrival at the exposure path in predetermined registered relation.

As the sheet of tracing paper moves along the approach path, it deflects switch arm 80A to close switch 80 and establish a circuit portion 93, illustrated in heavy lines in FIG. 8A, through a normally closed back contact of switch 81 for energizing relay coil 88C. A holding circuit 94, also illustrated in heavy lines in FIG. 8A, is established by the left-hand contact 88A of the relay and holds the relay coil 88C energized independently of circuit portion 93 established through the paper-sensing switches 80 and 81. As the sheet material moves through the exposure path and enters the delivery path D, it deflects the actuating arm 81A to open the back contact and close the front contact of switch 81 to establish a circuit portion 95, illustrated in heavy lines in FIG. 8B, that triggers both the print paper actuator 83 and the tracing paper actuator 84.

Since circuit portion 93 was broken by the actuation of switch 81, upon the establishment of circuit portion 95 and the energization of actuator 83, the microswitch 90 opens momentarily to release relay 88. The trailing end of the tracing sheet ultimately clears switch arm 80A to open switch 80 for preventing reenergization of relay 88 until the next passage of a tracing along the approach path. Before relay 88 can be energized, the sheet material must clear switch 81, but this may be delayed considerably beyond the closing of switch 80 on the second cycle.

During all of this time, a circuit 96, which is illustrated in heavy lines in FIG. 8B, holds the actuator 85 for the tracing ejector energized so that as the sheet material moves along the delivery path, the print paper which is held adjacent the belt 22 under the influence of the suction chamber 24 is guided up to the developing unit 30 for ultimate deposit in the copy paper storage tray 31 while the tracing, under the influence of suction chamber 28, initially moves along the belt 29 until it is stripped from the travel path by the guide plates 75 and guided via the belt 37 to the tracing storage tray 36.

The second feed cycle started with the triggering of actuators 83 and 84 over circuit portion 95 and as the second sheet of print paper and the second tracing sheet enter the machine, the switch 80 is closed and upon the previous sheet material clearing switch 81, its back contact closes to complete the circuit portion 93 for energizing the relay 88. This cycle will repeat until the supply of tracings is exhausted.

*Multiple-Copy Production*

For multiple-copy production, the counter 86 is set to the number of copies desired while the selection switch 87 has its contact arms 87C thrown to the left-hand position, as illustrated in FIGS. 9A, 9B and 9C.

It will again be assumed that the machine is running at low speed with the switch 91 closed, and switch 92 is then momentarily operated to energize actuators 83 and 84 simultaneously for feeding the first sheet of print paper and the sheet of tracing paper up to the cylinder in predetermined timed relationship.

As the tracing paper moves along the approach path A, it deflects sensing arm 80A to again establish circuit portion 93 as illustrated in heavy lines in FIG. 9A for energizing relay coil 88C, which again closes its contact arms 88A to establish the holding circuit 94, which is also illustrated in heavy lines in FIG. 9A.

As the sheet material moves through the exposure path and enters the delivery path, it deflects actuating arm 81A for opening the back contact of switch 81 and closing its front contact to establish a circuit portion 95, allustrated in heavy solid lines in FIG. 9B. During this time, the holding circuit 94, which is illustrated in broken heavy lines in FIG. 9B, maintains relay coil 88C energized to complete circuits from circuit portion 95, through the right-hand contact 88A of the relay, and then to the actuator 83 and also through a circuit portion 97, illustrated in heavy lines in FIG. 9B, to energize the counter coil 86C to step the counter one position for recording the print cycle.

During this time, circuits to the tracing feed actuator 84 and to the tracing ejector actuator 85 are open at counter switch 86S and thus no additional tracings are fed into the machine and the original tracing in the machine is permitted to move through the transfer path T for refeeding it to the approach path A. Since the print paper actuator 83 is operated at the time that the tracing piper first deflects the sensing switch 81 along the delivery path, a positional relationship is predetermined, and this relationship is such that the tracing paper, upon being refed around the transfer path and down the approach path, arrives at the cylinder simultaneously with the second sheet of print paper.

As the refed tracing moves along the approach path, it again deflects the actuating arm 80A of sensing switch 80 to prepare the circuit portion 93 of FIG. 9A for reenergization as soon as the sheet material clears switch 81. Circuit portion 93 reenergizes the relay coil 88C, which is then held energized by the circuit portion 94.

This cycle repeats until the final sheet of print paper, as determined by the particular number of copies selected, is passed through the exposure path and along the delivery path to operate sensing switch 81. At this time the coil 88C is energized through the holding circuit portion 94, illustrated in heavy broken lines in FIG. 9C, so that the right-hand relay contact 88A completes the circuit established through the front contact of sensing switch 81 and comprising circuit portions 95 and 97 for energizing the counter coil 86C to step the counter to its home position and close the counter switch 86S. This establishes a circuit portion 98 for energizing the tracing ejector actuator 85 and a circuit portion 99 for energizing the tracing feed actuator. Thus a new tracing is introduced into the machine while the former tracing is stripped from the transfer path by means of the guide plates 75 which are pivoted to their full-line position of FIG. 5 under the influence of actuator 85.

In the arrangement illustrated, if the second sheet of tracing paper is intended for copying the same number of times, the counter 86 resets automatically. Alternatively, it could be controlled by a suitable memory-type control device for automatically and selectively resetting the counter after each of its counting sequences. The procedures for mechanizing the counter to provide this programmed, automatic control will be familiar to those skilled in this art.

FIG. 10 Control Circuit and Operation

An improved control circuit arrangement is illustrated in FIG. 10 and it has the advantages over the circuit of FIG. 2 that it simplifies the control operations required of the operator of the machine and more readily accommodates desired adjustments in timing. The improved arrangement has but one selector switch 87, and a single push-button switch 92 starts its operation. With the arrangement of FIG. 10, the machine clears automatically when it is being stopped or when it is being changed from single to multiply-copy operation or vice versa and, in addition, the change in operation may be initiated at any time during a printing cycle. Convenient adjustment is provided for sychronizing the feeding of the print paper and the original tracings.

In addition, the machine can accommodate extremely short tracings and prints. By way of example, the following range of sizes can be handled by the single-machine arrangement when utilizing the control circuit of FIG. 10: any sheet size ranging from 3½" x 5½" to 18" x 24". It can handle two sets simultaneously (side-by-side) of sheet sizes ranging from 3½" x 5½" to 11½" x 18", and it can handle two sheets simultaneously (side-by-side) of any combination of sheets ranging between 3½" x 5½" and 11½" x 18".

Some of the components of the improved control circuit are identical with those described previously. For example, the actuators 83, 84 and 85, respectively, are again arranged to trigger the operation of the print paper feed mechanism 33, the tracing feed mechanism 35, and the tracing ejector mechanism TE. A copy counter and control switch mechanism 86 is again provided, and in this instance has two control switch contacts 86S1 and 86S2. The selection switch 87 has a ganged set of four contact arms 87C1, 87C2, 87C3, and 87C4, which are thrown up for single-copy production and down for multiple-copy production.

Figure 10A:
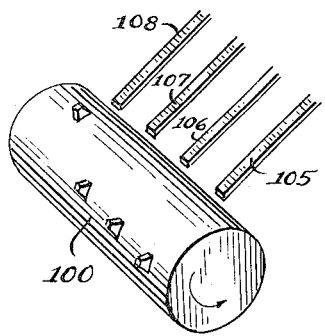
FIG. 10A is a diagrammatic illustration of a control cam arrangement utilized in conjunction with the circuit of FIG. 10.

Only one sheet material sensing switch is employed, and it is designated 80 and is located along the approach path A for actuation by each passage of a tracing, either upon its initial entry into the machine or during a subsequent refeed cycle. No synchronizing sensing switch is required along the delivery path D, this function now being controlled by a timing cam element 100 (FIG. 10A). The cam 100 is suitably connected to the shaft 79 (FIG. 6) through a solenoid-controlled clutch (not shown). The clutch for operatively connecting the cam 100 to the shaft 79 is engaged upon the energization of a relay coil 104 and the cam element rotates to successively actuate control switches 105, 106, 107 and 108.

Control switch 105 is connected to actuate a relay coil 109 during single-copy operation of the machine and also to actuate the tracing ejector actuator 85 at the proper time when changing from multiple to single-copy operation. Control switch 106 is connected to operate the actuator 84 for the original tracing feed mechanism 35, and control switch 107 is connected to operate the actuator 83 for the print paper feed mechanism 33. Each of control relays 110 and 111, respectively, are provided with sets of normally open contacts 110C1, 110C2 and 110C3; and 111C1 and 111C2 and 111C3; and these contacts are connected through the selection switch 87 so that for single-copy operation, relay 110 establishes circuit paths to the actuators 83 and 84 while for multiple-copy operation, relay 111 establishes circuit paths to the actuators 83 and 84. Control switch 108 is connected in the circuit in parallel with the sensing switch 80 in order to maintain the cam-controlling relay 104 energized independently of the length of the sheet material being handled. Normally, sensing switch 80 is closed by the sheet material to energize the cam-control relay 104. It is bypassed by the switch 108 to maintain the energization of relay 104 even after the sheet material has cleared the sensing switch 80.

During a normal printing cycle, the cam 100 operates microswitches 105, 106 and 107 momentarily and in quick succession at a time when the sheet material is travelling along the delivery path D at a point shortly in advance of the transfer path T. These switch operations by the cam 100 are timed to occur when the sheet material is approximately at the location of the sensing switch 81 which was employed in the previous embodiment. The cam element 100 continues its rotation until it finally opens nicroswitch 108 at a time when a refed original tracing is moving along an intermediate point along the transfer path T. The opening of microswitch 108 deenergizes the cam control relay 104 to disengage the cam clutch and stop the cam element 100 for a brief interval.

Cam rotation is triggered when the sensing switch 80 on the approach path A is deflected by a tracing. The distance travelled by a tracing when running in multiple copy operation around the exposure cylinder 20 and around the transfer tank is 23⁵⁄₁₆" for the illustrated arrangement. During this time, the cam rotates through one full cycle during the elapsed time corresponding to 20⅝" of this travel, and it remains at rest for the remaining 2¹¹⁄₁₆" of travel. Since the maximum tracing size has been specified as 18" in length, there is an adequate safety factor that allows for the effects of backlash, and the difference in the length of the travel paths of the original tracings and of the print paper. Since the arrangement allows the cam to pause momentarily following each printing cycle, and since the cam is restarted at a predetermined time by sensing switch 80, the machine automatically resynchronizes after each cycle; and this prevents error accumulation. In addition, the microswitches 106 and 107 may be mounted on individually adjustable brackets for location at different positions about the circumference of the cam 100 in making the final adjustment for synchronizing the feeding of the print paper with the feeding of the tracings. With this individual adjustability, synchronization is readily achieved even though the feed path to the exposure cylinder is longer for the tracing than for the print paper.

Single-Copy Production

The operation of the machine for single-copy production may best be understood by reference to FIGS. 1, 5, 11A, 11B, and 11C. At the start of single-copy production, as shown in FIG. 11A, the selection switch 87 has its contacts thrown to their "up" position. As indicated by the dashed lines, the push-button switch 92 is closed to establish a circuit portion 115 for energizing relays 110 and 111, which are thereafter held energized by a circuit portion 116 (shown in full lines) which is connected to the line through contact 87C4 and which is connected to these relays through a "hold" contact 110C3. Simultaneously, push-button 92 establishes a circuit path 117 (shown in dashed lines) to energize control relay 88 and, through its contact 88A, a circuit is momentarily established to energize cam clutch control relay 104 and rotate cam 100, which first closes switch 108 for maintaining energization of cam clutch relay 104.

During this starting cycle, no printing is accomplished, but the starting cycle serves to establish the proper conditions in the machine for thereafter effecting automatic single-copy production.

As the cam 100 continues its rotation during the starting cycle, it first operates switch 105 (FIG. 11A) to establish a circuit path 118 (shown in full lines), which leads through selection switch contact 87C1 to energize control relay 109, which is then held energized through its "hold" contact 109C2, which is connected to circuit portion 116 through a branch circuit 119 (shown with arrowheads in FIG. 11A and in full lines in FIG. 11B).

The next sequence in the circuit operation for the starting cycle of single-copy production is shown in FIG. 11B wherein, as indicated therein, the cam 100 has now closed switch 106 for energizing the actuator 84 to feed an original tracing into the machine. Parallel circuit paths 120 and 121 connect from microswitch 106 to a junction point 122 which is connected over a circuit path 123 to the actuator 84. Control switch 107 is operated, shortly after 106 is released, to establish a circuit path 124 (indicated by means of arrowheads), which leads through contact 110C1 and selection switch contact 87C2 to a circuit path 125 that connects to the print paper feed actuator 83.

Now, as a sheet of print paper is being advanced along the feed path F and an original tracing sheet is being advanced along the approach path A, the cam 100 completes its first cycle of revolution and returns to the position at which it opens switch 108 to deenergize the cam clutch control relay 104 and thereby stop the cam at this position. Thus at the beginning of the second operating cycle, which is the first actual printing cycle, the circuit is in the condition in which it is shown in full lines in FIG. 11C wherein relays 109, 110 and 111 are all energized and relays 86, 88 and 104 are deenergized.

As the original tracing engages sensing switch 80, cam clutch relay 104 is energized through the circuit shown with arrowheads and thereafter held energized by the closing of microswitch 108 in response to initial cam movement to drive the cam through another operating cycle.

During this cycle, cam-controlled switches 105, 106 and 107 are momentarily actuated in that order, with switch 105 having no effect, with switch 106 operating tracing actuator 83, and with switch 107 actuating print paper actuator 84. Thus another tracing and another sheet of print paper are introduced into the machine, with the cam 100 stopping at its rest position pending actuation of the sensing switch 80 by the tracing as it moves along the approach path.

The counter 86 is not involved in single-copy operation, while the tracing ejector actuator 85 is continuously held energized through contact 109C3 during single-copy operation, and thus the tracing ejector TE occupies the position in which it is shown in full lines in FIGS. 1 and 5. The ejector guides 75 thus strip each tracing from its suction engagement along the transfer path.

*Multiple-Copy Production*

For multiple-copy production, reference should be made to FIGS. 1, 5 and 12A, 12B, 12C, and 12D. In this arrangement the counter 86 is set to the number of copies which are desired while the selection switch 87 is thrown to its "down" position.

The starting cycle for multiple-copy production is illustrated in FIG. 12A wherein, as indicated by the dashed lines, the push-button switch 92 is closed to again establish a circuit portion 115 for energizing relays 110 and 111, which are then held energized by a circuit portion 126 which is connected to the line through contact 87C4 and which is connected through "hold" contact 111C3 to maintain relays 110 and 111 energized. Simultaneously, push-button 92 establishes circuit path 117 to energize control relay 88 and, through its contact 88A, to energize the cam clutch control relay 104 and initiate rotation of the cam element 100. Once again, during the starting cycle no printing is accomplished but the starting cycle serves to establish the proper conditions within the machine for thereafter carrying out automatic multiple-copy production.

As the cam 100 begins its cycle of rotation, switch 108 closes to provide an alternate path for energizing the cam clutch control relay 104.

As the cam 100 continues its rotation, it first actuates switch 105, but both of its contacts are open-circuited at selection switch contact 87C1 and at control relay contact 109C1. The cam next closes switch 106 to establish the circuit path 120 for energizing the actuator 84 that feeds original tracings into the machine. The path 120 is established through the upper contact 88B of control relay 88, and this same contact open-circuits the counter 86 to prevent a false count during the starting cycle. To accomplish this, the push-button 92 must be held energized during this starting cycle to hold relay 88 energized. The cam next operates switch 107 to establish the circuit, which, as indicated by arrowheads in FIG. 12A, includes a circuit path 124 connected at junction 127 to a circuit path 128 that is completed through contact 111C1 and contact 87C2 to the circuit path 125 that leads to the print paper feed mechanism actuator 83.

Now print paper is being advanced along the feed path F and tracing paper is being advanced along the approach path A while the cam element 100 opens switch 108 to deenergize the cam clutch control relay 104 and stop the cam. Thus, as the second operating cycle, or the first actual printing cycle, begins, the circuit is in the condition in which it is shown in FIG. 12B wherein relays 110 and 111 are energized and relays 86, 88 and 104 are deenergized. As the tracing passes and actuates the sensing switch 80 located along the approach path A, the cam clutch control relay 104 is energized over the circuit indicated by the arrowheads in FIG. 12B. This energizes the cam clutch to start the cam through another cycle of rotation.

As shown in FIG. 12C, the cam clutch control relay 104 is continuously held energized by switch 108 to maintain the cam rotation and cause it to successively actuate switches 105, 106 and 107. As explained previously, microswitch 105 is unnecessary to multiple-copy production. As indicated in FIG. 12C by the dashed lines, switch 106 is closed temporarily to connect through circuit path 120 and the upper contact of arm 88B to momentarily energize the counter 86 and advance it one step. This actuation of the counter merely registers the fact that one copy has been made and does not cause the counter contacts to close. As is shown in full lines in FIG. 12C, switch 107 is then actuated to complete a circuit over lines 124 and 128 through contacts 111C1 and 87C2 to line 125 and the print paper feeding actuator 83. The operation of actuator 83 is timed to supply print paper to the feed path F to arrive at the exposure path E conjointly with the refed original tracing sheet which moves around the transfer path T, back through the approach path A, and into the exposure path. While the original tracing is on the transfer path, it clears sensing switch 80, which then opens. The cam 100 rotates to the position where it opens switch 108 to deenergize the cam clutch relay 104 and stop the cam. The cam remains stationary until the refed tracing actuates sensing switch 80.

Each following printing cycle duplicates that already described until the final printing cycle, during which the operation of the counter over lines 120 and 129 brings it to home position and causes its contacts 86A and 86B to close, as indicated in FIG. 12D. Contact 86A completes a circuit 130 for operating the tracing ejector actuator 85. Contact 86B completes a circuit 131 through contacts 111C2 and 87C3 to circuit 125 for operating the actuator 84, which triggers the tracing feed mechanism 35 to introduce a new tracing. The new tracing moves along the approach path A to arrive at the exposure path E conjointly with another sheet of copy paper which is supplied when the cam operates switch 107 shortly after having operated switch 106.

The foregoing description and drawings are given merely to explain and illustrate the invention and the manner in which it may be performed, and the invention is not to be limited thereto, except insofar as the appended claims are so limited since those skilled in the art who have this disclosure before them will be able to make modifications and variations therein without departing from the scope and spirit of the invention.

We claim:

1. Automatic photoprinting apparatus for handling cut sheets of copy material individually and comprising a translucent exposure member having a light source associated therewith to provide an exposure path, means for advancing sheet material along a feed path leading up to said exposure path, then along said exposure path, and then along a delivery path, means for supplying a sheet of copy material to said feed path, means for advancing a sheet of original material along an approach path separate from and leading up to said exposure path, means for maintaining copy material along said delivery path, transfer means for refeeding only the exposed sheet of original material from said delivery path along a transfer path spaced from said exposure member leading to said approach path, and control means operable when sheet material is moving across a location on said delivery path in advance of said transfer path for disabling said original material feeding means and for actuating said copy material feeding means to feed another sheet of copy material to arrive at said exposure path conjointly with said refed sheet of original material.

2. Automatic photoprinting apparatus comprising a translucent exposure member defining an exposure path and having a light source associated therewith for illuminating sheet material moving along said path, means including copy material feeding means and original material feeding means for conjointly feeding a sheet of copy material and a sheet of original material along said exposure path, means for feeding the exposed sheets of copy and original material from said exposure path along a delivery path towards a delivery point, transfer means for refeeding only the exposed sheet of original material from said delivery path along a transfer path to arrive at said exposure path conjointly with said copy material, and selectively settable automatic control means responsive to the presence of sheet material moving along said delivery path at a point thereof in advance of said transfer path and operative in one condition to enable said transfer means and to disable said original material feeding means and operative in a second condition to disable said transfer means and to enable said original material feeding means.

3. Automatic photoprinting apparatus comprising a translucent exposure member having a light source associated therewith for illuminating sheet material moving across said member, means for advancing sheet material along a feed path leading up to said member, then along an exposure path leading across said member, and then along a delivery path leading away from said exposure path, means for supplying copy material to said feed path, means for advancing sheet material along an approach path separate from and leading up to the exposure path, means for feeding a sheet of original material to said approach path, transfer means for refeeding only the exposed sheet of original material from said delivery path along a transfer path separate from said exposure path and leading to said approach path, and selectively settable automatic control means responsive to the presence of sheet material moving along said delivery path at a point thereof in advance of said transfer path and operative in one condition to enable said transfer means and to disable said original material supplying means and operative in a second condition to disable said transfer means and to enable said original material supplying means.

4. Automatic photoprinting apparatus comprising a translucent exposure cylinder having a light source contained therein, means for advancing sheet material along a feed path leading up to a point on the periphery of said cylinder, then along an exposure path leading partially around the periphery of said cylinder, and then along a delivery path leading away from the periphery of said cylinder, means for advancing sheet material along an approach path leading up to said point on the periphery of said cylinder, means for supplying a sheet of copy material to said feed path, means for supplying a sheet of original material to said approach path, means for maintaining said copy material along said delivery path, means for advancing sheet material along a transfer path spaced from the periphery of said cylinder for refeeding a sheet of original material from said delivery path to said approach path, and control means comprising an original material ejector operable to prevent refeeding of original material by said transfer means, means including a counter for determining the number of copies to be made from a given sheet of original material, a first actuator for said original material feeding means, a second actuator for said copy material feeding means, means responsive to each passage of said sheet of original material through said apparatus for operating said counter and said second actuator to supply a sheet of copy material to said feed path to arrive at said exposure path conjointly with the refed sheet of original material, and means responsive to the final actuation of said counter for also actuating said ejector and said first actuator to remove the first sheet of original material and to supply another sheet of original material to arrive at said exposure path conjointly with another sheet of copy material.

5. Automatic photoprinting apparatus for handling cut sheets of copy material individually and comprising a translucent exposure cylinder having a light source contained therein, means providing webbing for advancing sheet material along a feed path leading up to a point on the periphery of said cylinder, then along an exposure path leading partially around the periphery of said cylinder, and then along a delivery path leading away from the periphery of said cylinder, means for supplying copy material to said feed path, means providing webbing for advancing sheet material along an approach path leading up to said cylinder at a point in advance of said feed path, means for holding copy material to said webbing along said delivery path, and means providing webbing disposed between said delivery path and said approach path to form a transfer path spaced from the periphery of said cylinder for refeeding original material from said delivery path to said approach path, and means operable when said original material is moving along said delivery path in advance of said transfer path for actuating said copy material feeding means to supply a sheet of copy material to arrive at said point on said cylinder conjointly with the sheet of original material.

6. Automatic photoprinting apparatus for handling cut sheets of copy material individually and comprising a translucent exposure cylinder having a light source contained therein, means providing webbing for advancing sheet material along a feed path leading up to a point on the periphery of said cylinder, then along an exposure path leading partially around the periphery of said cylinder, and then along a delivery path leading away from the periphery of said cylinder, means for supplying copy material to said feed path, means providing webbing for advancing sheet material along an approach path leading up to said cylinder at a point in advance of said feed path, means for holding copy material to said webbing along said delivery path, means providing webbing disposed between said delivery path and said approach path to form a transfer path spaced from the periphery of said cylinder for refeeding original material from said delivery path to said approach path, and synchronizing means operable when the sheet material is moving across a predetermined point on said delivery path in advance of said transfer path for actuating said copy material supplying means to feed another sheet of copy material along said feed path to arrive at said point on said cylinder conjointly with said refed original material.

7. Automatic photoprinting apparatus for handling precut sheets of copy material individually and comprising a translucent exposure member defining an exposure path and having a light source associated therewith for illuminating sheet material moving along said path, first means for feeding sheet material along said exposure path, second means for advancing copy material along a feed path leading to said exposure path, third means for advancing original material along an approach path separate from and leading to said exposure path, fourth means for feeding copy and original material from said exposure path along a delivery path leading to a delivery point, fifth means for feeding only exposed original material from said delivery path and along a transfer path separate from said exposure path and leading to said approach path to arrive at said exposure path conjointly with another sheet of copy material, and selectively settable automatic control means responsive to the presence of sheet material moving along said delivery path at a point thereof in advance of said transfer path and operative in one condition to disable said third means and to enable said fifth means and operative in a second condition to enable said third means and to disable said fifth means.

8. Automatic photoprinting apparatus comprising a translucent light cylinder defining an exposure path extending partially about the periphery thereof, said cylinder being rotatable and having a light source therein for illuminating sheet material moving along said path, first means for advancing copy material to said exposure path, second means for advancing original material along an approach path leading to said exposure path, third means for feeding exposed copy and original material conjointly along a delivery path leading from the periphery of said cylinder towards a delivery point, fourth means comprising a transfer path spaced from the periphery of said cylinder and leading from said delivery path to said approach path, said transfer path extending around a peripheral section of said cylinder that is opposed to the exposure path section of the periphery of the cylinder, and control means for refeeding only exposed original material from said delivery path, along said transfer path, and to said approach path.

9. Photoprinting apparatus comprising a main frame having spaced apart end plate structure, a translucent exposure member and coextensive guide rollers mounted between said end plate structure, means including webbing trained about said guide rollers and about a portion of the periphery of said cylinder for providing a sheet material feed path leading generally rearwardly to a point adjacent the bottom of the periphery of said cylinder, then along an exposure path leading around the rear of the periphery of said cylinder and then along a delivery path leading generally upwardly from adjacent the rear of the cylinder, means including a guide roller mounted between said end plate structure to mount webbing for defining an approach path for advancing sheet material generally downwardly and rearwardly towards a point at the front of the cylinder periphery, and means including a guide roller mounted between said end plate structure to mount webbing for defining a transfer path leading generally forwardly from said delivery path to said approach path to refeed sheet material around said cylinder.

10. Photoprinting apparatus comprising a stationary main frame having spaced end plates, a translucent exposure member and coextensive guide rollers mounted between said end plates, means including webbing trained about said guide rollers and about a portion of the periphery of said cylinder for providing a sheet material feed path leading generally rearwardly to a point adjacent the bottom of the periphery of said cylinder, then along an exposure path leading around the rear of the periphery of said cylinder and then along a delivery path leading generally upwardly from adjacent the rear of the cylinder, a secondary frame having end plate structure spaced apart correspondingly to the end plates of said main frame, means connecting said secondary frame adjacent a rearward upper portion thereof to said main frame adjacent a forward upper portion thereof to mount said secondary frame for swinging movement away from said main frame, means including a guide roller mounted between said end plate structure to mount webbing for defining an approach path for advancing sheet material generally downwardly and rearwardly towards a point at the front of the cylinder periphery, and means including a guide roller mounted between said end plate structure to mount webbing for defining a transfer path leading generally forwardly from said delivery path to said approach path to refeed sheet material around said cylinder.

11. Automatic photoprinting apparatus for handling cut sheets of copy material individually and comprising a translucent exposure member having a light source associated therewith to provide an exposure path, means including copy material feeding means and original material feeding means for conjointly feeding a sheet of copy material and a sheet of original material in registry along said exposure path, means for feeding the exposed sheets of copy and original material from said exposure path along a delivery path towards a delivery point, transfer means for refeeding only the exposed sheet of original material from said delivery path along a transfer path leading to said exposure path, sensing switch means operable in response to a sheet of original material approaching said exposure path, means including a control cam operably connected to disable said original material feeding means and to actuate said copy material feeding means, drive means responsive to said sensing switch means for cyclically actuating the cam during each printing cycle to synchronize the feeding, for the next printing cycle, of another sheet of copy material to arrive at the exposure path conjointly with the refed sheet of original material, and automatic means for stopping the cam at the same predetermined position at the end of each operating cycle thereof.

12. Automatic photoprinting apparatus for handling cut sheets of copy material individually and comprising a translucent exposure member having a light source associated therewith to provide an exposure path, means including copy material feeding means and original material feeding means for conjointly feeding a sheet of copy material and a sheet of original material in registry along said exposure path, means for feeding the exposed sheets of copy and original material from said exposure path along a delivery path towards a delivery point, transfer means for refeeding only the exposed sheet of original material from said delivery path along a transfer path leading to said exposure path, sensing switch means operable in response to a sheet of original material approaching said exposure path, means including a control cam operably connected to disable said original material feeding means and to actuate said copy material feeding means, drive means responsive to said sensing switch means for cyclically actuating the cam during each printing cycle to synchronize the feeding, for the next printing cycle, of another sheet of copy material to arrive at the exposure path conjointly with the refed sheet of original material, and cam-controlled switch means connected to by pass said sensing switch means to independently maintain operation of said drive means and connected to open after said cam has completed its control functions and after said original material has cleared said sensing switch means to stop the cam at the same predetermined position at the end of each operating cycle thereof.

13. Automatic photoprinting apparatus comprising a translucent exposure cylinder having a light source contained therein, means for advancing sheet material along a feed path leading up to a point on the periphery of said cylinder, then along an exposure path leading partially around the periphery of said cylinder, and then along a delivery path leading away from the periphery of said cylinder, means for advancing sheet material along an approach path leading up to said point on the periphery of said cylinder, means for supplying a sheet of copy material to said feed path, means for supplying a sheet of original material to said approach path, means for maintaining said copy material along said delivery path, means for advancing sheet material along a transfer path spaced from the periphery of said cylinder for refeeding a sheet of original material from said delivery path to said approach path, and control means comprising an original material ejector operable to prevent refeeding of original material by said transfer means, means including a counter for determining the number of copies to be made from a given sheet of original material, a first actuator for said original material feeding means, a second actuator for said copy material feeding means, means including a control cam operably connected for operating said counter and said second actuator during each passage of said sheet of original material through said appartus, sensing switch means operable in response to a sheet of original material moving along said approach path towards said exposure path, drive means responsive to said sensing switch means for cyclically actuating the cam during each printing cycle to synchronize the feeding, for the next printing cycle, of another sheet of copy material to arrive at the exposure path conjointly with a refed sheet of original material, and automatic means for stopping the cam at the same predetermined position at the end of each operating cycle thereof, and means responsive to the final actuation of said counter and controlled by said cam for also actuating said ejector and said first actuator to remove the first sheet of original material and to supply another sheet of original material to arrive at said exposure path conjointly with another sheet of copy material.

14. Automatic photoprinting apparatus comprising a translucent exposure cylinder having a light source contained therein, means for advancing sheet material along a feed path leading up to a point on the periphery of said cylinder, then along an exposure path leading partially around the periphery of said cylinder, and then along a delivery path leading away from the periphery of said cylinder, means for advancing sheet material along an approach path leading up to said point on the periphery of said cylinder, means for supplying a sheet of copy material to said feed path, means for supplying a sheet of original material to said approach path, means for maintaining said copy material along said delivery path, means for advancing sheet material along a transfer path spaced from the periphery of said cylinder for refeeding a sheet of original material from said delivery path to said approach path, and control means comprising an original material ejector operable to prevent refeeding of original material by said transfer means, means including a counter for determining the number of copies to be made from a given sheet of original material, a first actuator for said original material feeding means, a second actuator for said copy material feeding means, means including a control cam operably connected for operating said counter and said second actuator during each passage of said sheet of original material through said apparatus, sensing switch means operable in response to a sheet of original material moving along said approach path towards said exposure path, drive means responsive to said sensing switch means for cyclically actuating the cam during each printing cycle to synchronize the feeding, for the next printing cycle, of another sheet of copy material to arrive at the exposure path conjointly with a refed sheet of original material, and cam-controlled switch means connected to bypass said sensing switch means to independently maintain operation of said drive means and connected to open after said original material has cleared said sensing switch means to stop the cam at the same predetermined position at the end of each operating cycle thereof, and means responsive to the final actuation of said counter and controlled by said cam for also actuating said ejector and said first actuator to remove the first sheet of original material and to supply another sheet of original material to arrive at said exposure path conjointly with another sheet of copy material.

15. Automatic photoprinting apparatus for handling cut sheets of copy material individually and comprising a translucent exposure cylinder having a light source contained therein, means providing webbing for advancing sheet material along a feed path leading up to a point on the periphery of said cylinder, then along an exposure path leading partially around the periphery of said cylinder, and then along a delivery path leading away from the periphery of said cylinder, means for supplying copy material to said feed path, means providing webbing for advancing sheet material along an approach path leading up to said cylinder at a point in advance of said feed path, means for holding copy material to said webbing along said delivery path, and means providing webbing disposed between said delivery path and said approach path to form a transfer path spaced from the periphery of said cylinder for refeeding original material from said delivery path to said approach path, means including a control cam operably connected to actuate said copy material supplying means during each passage of a sheet of original material through said apparatus, sensing switch means operable in response to a sheet of original material moving along said approach path towards said exposure path, and drive means responsive to said sensing switch means for cyclically actuating the cam during each printing cycle to synchronize the supply, for the next printing cycle, of another sheet of copy material to arrive at the exposure path conjointly with the refed sheet of original material.

16. Automatic photoprinting apparatus for handling cut sheets of copy material individually and comprising a translucent exposure member having a light source associated therewith to provide an exposure path, means including copy material feeding means and original material feeding means for conjointly feeding a sheet of copy material and a sheet of original material in registry along said exposure path, means for feeding the exposed sheets of copy and original material from said exposure path along a delivery path towards a delivery point, transfer means for refeeding only the exposed sheet of original material from said delivery path along a transfer path leading to said exposure path, and means responsive to the presence of sheet material moving across a point on said delivery path in advance of said transfer path for disabling said original material feeding means and for actuating said copy material feeding means to feed another sheet of copy material to arrive at said exposure path conjointly with said refed sheet of original material.

17. Automatic photoprinting apparatus for handling cut sheets of copy material individually and comprising a translucent exposure member having a light source associated therewith to provide an exposure path, means for advancing sheet material along a feed path leading up to said exposure path, then along said exposure path, and then along a delivery path, means for supplying a sheet of copy material to said feed path, means for advancing a sheet of original material along an approach path separate from the exposure member and leading up to said exposure path, means for maintaining copy material along said delivery path, transfer means for refeeding only the exposed sheet of original material from said delivery path along a transfer path spaced from said exposure member and leading to said approach path, and means for sensing said sheet material as it moves past a point on said delivery path in advance of said transfer path for actuating said copy material supplying means to feed another sheet of copy material along said feed path to arrive at said exposure path conjointly with said refed sheet of original material.

18. Automatic photoprinting apparatus for use with cut sheets of copy material comprising a translucent exposure member defining an exposure path and having a light source associated therewith for illuminating sheet material moving along said exposure path, means including copy material feeding means and original material feeding means for conjointly feeding a sheet of copy material and a sheet of original material along said exposure path, means for feeding said sheet of copy and original material from said exposure path along a delivery path, transfer means for refeeding the sheet of original material from said delivery path along a transfer path to arrive at said exposure path conjointly with another sheet of copy material, and control means comprising an original material ejector operable to prevent refeeding of original material by said transfer means, a first actuator for said original material feeding means, a counter for determining the number of copies to be made from a given sheet of original material and having a normally open switch and a counting element for closing said switch after a predetermined number of copies, a first common energizing circuit for said ejector and said first actuator and having said normally open counter switch therein, a second actuator for said copy material feeding means, a control relay operative for partially establishing a second common energizing circuit to said counter element and to said second actuator, a third energizing circuit for operating said control relay, means responsive to said sheet of original material approaching said exposure path for establishing said third energizing circuit to operate said relay and thereby partially establish said second common energizing circuit, and means responsive to each passage of said sheet of original material along said delivery path for completely establishing said second common energizing circuit to momentarily actuate said counter element and said second actuator and for opening said third energizing circuit.

19. Automatic photoprinting apparatus for use with cut sheets of copy material comprising a translucent exposure member defining an exposure path and having a light source associated therewith for illuminating sheet material moving along said exposure path, means including copy material feeding means and original material feeding means for conjointly feeding a sheet of copy material and a sheet of original material along said exposure path, means for feeding said sheet of copy and original material from said exposure path along a delivery path, transfer means for refeeding the sheet of original material from said delivery path along a transfer path to arrive at said exposure path conjointly with another sheet of copy material, and control means comprising an original material ejector operable to prevent refeeding of original material by said transfer means, a first actuator for said original material feeding means, a counter for determining the number of copies to be made from a given sheet of original material and having a normally open switch and a counting element for closing said switch after a predetermined number of copies, a first common energizing circuit for said ejector and said first actuator and having said normally open counter switch therein, a second actuator for said copy material feeding means, a control relay operative for partially establishing a second common energizing circuit to said counter element and to said second actuator, a third energizing circuit for operating said control relay, means establishing a bypass circuit in response to operation of said relay for maintaining such relay operated, means responsive to a sheet of original material approaching said exposure path for establishing said third energizing circuit to operate said relay and thereby partially establish said second common energizing circuit, means responsive to each passage of said sheet of original material along said delivery path for completely establishing said second common energizing circuit to momentarily actuate said counting element and said second actuator and for opening said third energizing circuit, and means responsive to energization of said second actuator for momentarily opening said bypass circuit.

20. Automatic photoprinting apparatus for use with cut sheets of copy material comprising a translucent exposure member defining an exposure path and having a light source associated therewith for illuminating sheet material moving along said path, means including copy material feeding means and original material feeding means for conjointly feeding a sheet of copy material and a sheet of original material along said exposure path, means for feeding said sheets of copy and original material from said exposure path along a delivery path, and control means comprising a first actuator for said original material feeding means, an energizing circuit for said actuator, a second actuator for said copy material feeding means, a control relay operative for partially establishing a second energizing circuit to said second actuator, a third energizing circuit for operating said control relay, means responsive to a sheet of original material approaching said exposure path for establishing said third energizing circuit, and means responsive to each passage of sheet material along said delivery path for completely establishing said second energizing circuit to momentarily actuate said second actuator and for opening said third energizing circuit.

21. Automatic photoprinting apparatus for use with cut sheets of copy material comprising a translucent exposure member defining an exposure path and having a light source associated therewith for illuminating sheet material moving along said path, means including copy material feeding means and original material feeding means for conjointly feeding a sheet of copy material and a sheet of original material along said exposure path, means for feeding said sheet of copy and original material from said exposure path along a delivery path, and control means comprising a first actuator for said original material feeding means, an energizing circuit for said actuator, a second actuator for said copy material feeding means, a control relay operative for partially establishing a second energizing circuit to said second actuator, a third energizing circuit for operating said control relay, a bypass circuit responsive to operation of said relay for maintaining such relay operated, means responsive to a sheet of original material approaching said exposure path for establishing said third energizing circuit, means responsive to each passage of sheet material along said delivery path for completing the establishment of said second energizing circuit to momentarily actuate said second actuator and for opening said third energizing circuit, and means responsive to energization of said second actuator for momentarily opening said bypass circuit.

22. Automatic photoprinting apparatus for use with cut sheets of copy material comprising a translucent exposure member defining an exposure path and having a light source associated therewith for illuminating sheet material moving along said exposure path, means including copy material feeding means and original material feeding means for conjointly feeding a sheet of copy material and a sheet of original material along said exposure path, means for feeding said sheet of copy and original material from said exposure path along a delivery path, transfer means for refeeding the sheet of original material from said delivery path along a transfer path to arrive at said exposure path conjointly with another sheet of copy material, control means comprising an original material ejector operable to prevent refeeding of original material by said transfer means, a first actuator for said original material feeding means, a counter for determining the number of copies and having a normally open switch and a counting element for closing said switch after a predetermined number of copies, a first common energizing circuit for separate connection to said ejector and to said first actuator and having said normally open counter switch therein, a normally open bypass circuit across said counter switch, a second actuator for said copy material feeding means, a control relay operative for partially establishing a second common energizing circuit for separate connection to said counter element and to said second actuator, a third energizing circuit for operating said control relay, means responsive to a sheet of original material approaching said exposure path for establishing said third energizing circuit, means responsive to each passage of sheet material along said delivery path for momentarily completely establishing said second common energizing circuit and for opening said third energizing circuit, and selectively positionable switching means operative in its multiple-copy position to connect said first common energizing circuit to both said first actuator and said ejector, to connect said second common energizing circuit to both said counter element and said second actuator, and to open said bypass circuit and operative in its single-copy position to connect said second common energizing circuit to both said first actuator and said second actuator and to connect said bypass circuit across said counter switch to maintain said ejector continuously energized.

23. Automatic photoprinting apparatus for handling cut sheets of copy material individually and comprising a translucent exposure member having a light source associated therewith to provide an exposure path along said member, means including a feeder for sheets of copy material and a feeder for sheets of original material for feeding to said exposure path conjointly and in substantial registry a sheet of copy material and a sheet of original material, means for continuously moving said last named sheets along said exposure path and towards a delivery point, transfer means between said exposure path and delivery point for feeding only the exposed sheet of original material along a transfer path leading to the entrance to said exposure path, and control means responsive to the presence of sheet material moving from said exposure path towards said delivery point for disabling said feeder of original material and for actuating said feeder of copy material to feed a sheet thereof to arrive at said exposure path conjointly with the refed sheet of original material.

References Cited in the file of this patent
UNITED STATES PATENTS

| | | |
|---|---|---|
| 2,220,526 | Kluitman | Nov. 5, 1940 |
| 2,371,925 | Schade | Mar. 20, 1945 |
| 2,574,215 | Kunstadter | Nov. 6, 1951 |

FOREIGN PATENTS

| | | |
|---|---|---|
| 643,566 | Great Britain | Sept. 20, 1950 |